MODULATION CONVERSION SYSTEM

Filed Dec. 5, 1947

INVENTORS
EUGENE R. SHENK
& ANTHONY LIGUORI
BY [signature]
ATTORNEY

Patented Apr. 25, 1950 2,505,368

UNITED STATES PATENT OFFICE 2,505,368

MODULATION CONVERSION SYSTEM

Eugene R. Shenk, Brooklyn, and Anthony Liguori, New York, N. Y., assignors to Radio Corporation of America, a corporation of Delaware Application December 5, 1947, Serial No. 789,788

4 Claims. (Cl. 332—1)

The present invention relates to systems for deriving signals representing scanned subject matter such as an object or a representation in the form of a picture, document, printed matter, map, or other form, and, more particularly, but not necessarily exclusively, to novel apparatus for deriving signals suitable for operating a facsimile recorder to reproduce subject matter in facsimile.

The invention has for its principal aim or object to provide a novel system employing trigger circuits in a frequency demodulator thereby to provide a demodulator having a linear characteristic of wide range.

Another aim or object of the invention is to provide an improved method of converting a frequency modulated facsimile signal to an amplitude varying signal.

Another object of the invention is to provide a novel frequency meter especially useful in connection with a facsimile demodulator.

A still further object is to provide novel means for varying the output contrast between limits of a received signal to suit the characteristics of a facsimile recorder.

A still further object is to provide a novel method of measuring frequency.

Other objects and advantages of the present invention will become apparent and immediately suggest themselves to those skilled in the art to which the invention is directed from a reading of the following specification in connection with the accompanying drawings in which.

Figures 1, 2:
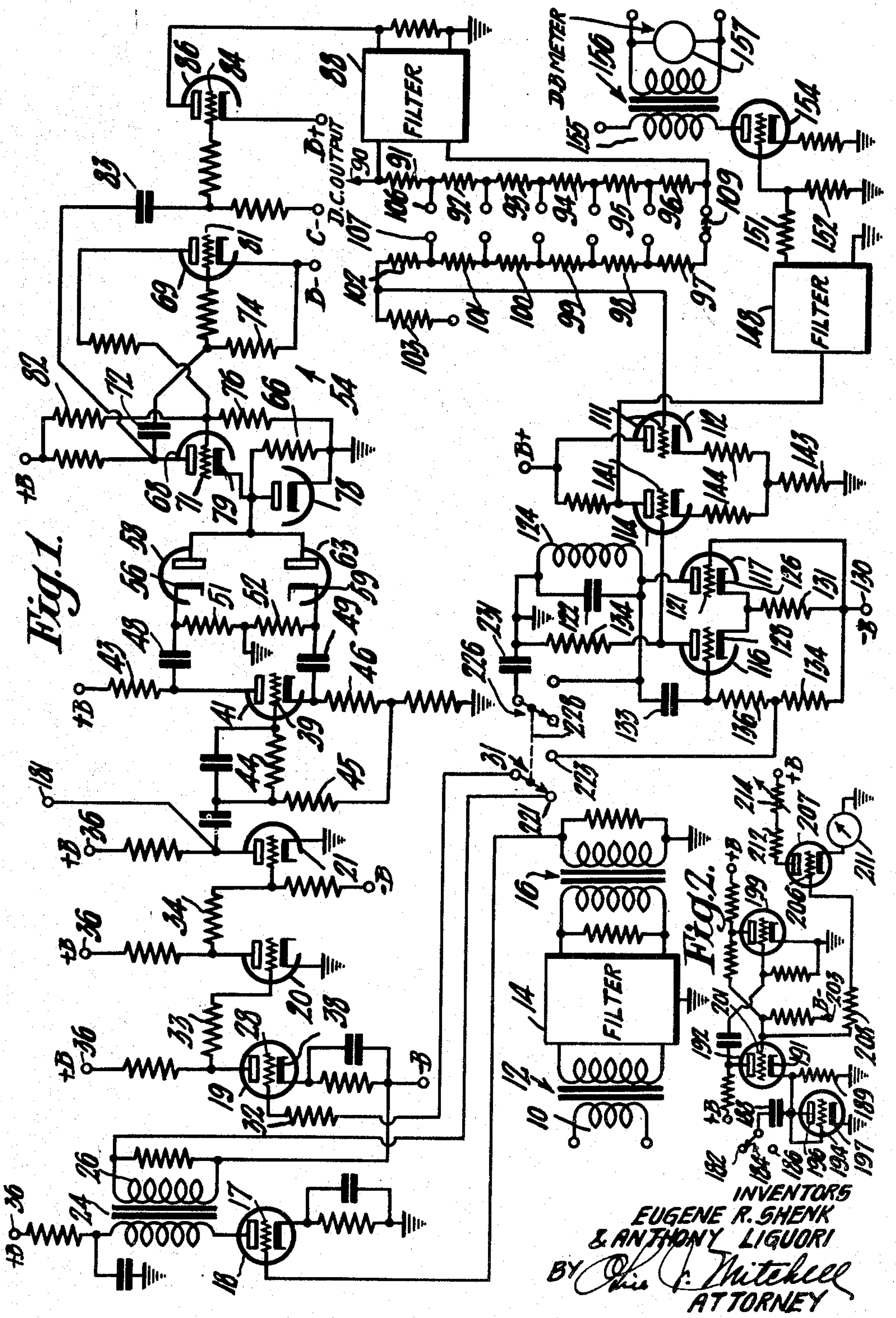
Figure 1 is the schematic diagram of a frequency modulation to amplitude modulation section of a circuit embodying features of the invention.
Figure 2 is a schematic diagram of a frequency meter circuit embodying features of the invention.

The received facsimile signal may be detected and amplified in a radio receiver (not shown) and fed as a frequency modulated signal to the primary 10 of a transformer 12. This transformer serves as a step-up transformer and impedance matching device to match the line impedance to the impedance of a filter 14. The filter 14 is a band-pass filter passing only the desired band and eliminating any extraneous frequencies. The desired signal band is then fed through a transformer 16 to the grid 17 of a tube 18. The tube 18 and tubes 19, 20 and 21 and their associated components constitute an amplifier and a cascade voltage amplitude limiter having special provisions to insure that the limited output signal is a square wave over a wide range of input levels. The duration of each pulse of this square wave signal is equal to the duration of the intervals between pulses so that a 50/50 square wave results.

Referring to Fig. 1 of the drawings there is shown diagrammatically a demodulating system in accordance with the invention. An accompanying modulating system is also shown. Arrangements for generating a frequency varying signal are disclosed in U. S. Patent No. 2,257,282, granted to J. E. Smith et al. on September 30, 1941. Another arrangement for modulating a tone with image signals to provide a frequency modulated tone or carrier is shown in U. S. Patent No. 2,321,269, granted to Maurice Artzt on June 8, 1943. The frequency modulated signal source may be a transmitter modulated by speech and the signals may occur in bursts.

The frequency modulated input, for example a facsimile signal, is applied to the first stage of the limiter by way of a coupling transformer 24, the secondary 26 of which is connected to the grid 28 of the first limiter tube 19 by way of a switch 31. The purpose of this switch will be explained hereinafter. The grid circuits of the limiter tubes 19, 20, and 21 are provided with resistors 32, 33 and 34. The incoming signal, for example the signal wave appearing at the input 10, alternatively drives the limiter tubes from beyond cut-off to grid current limiting to produce the square wave. The anodes of the tubes 18 to 21 are connected to the positive terminal of a suitable direct current source (not shown) by way of the terminals 36. The cathode 38 of the tube 19 is connected to the negative terminal of another direct current source (not shown) the cathode of the tubes 20 and 21 are grounded.

The square wave output from the limiter is applied to the grid 39 of a phase inverter tube 41. The outputs from the tube 41 are taken across a plate resistor 43 and a cathode resistor 46 so that these two outputs are 180° out of phase. Resistors 44 and 45 are grid return resistors. It will be understood that other phase inversion arrangements may be employed if desired instead of the particular phase inverter arrangement shown.

In effect, when the output across the resistor 43 is in the negative direction, then the output across the resistor 46 is in the positive direction. The negative portions of these two square waves are differentiated by differentiator circuits comprising the capacitors 48 and 49 and the resistors 51 and 52 the common terminal of which is grounded. It will be understood that the output appearing across the resistor 43 is differentiated by the differentiating circuit 48—51 and the output appearing across the resistor 46 is differentiated by the differentiating circuit 49—52. The negative pulses resulting from this simultaneous differentiation are employed for controlling the trigger circuit 54. At every transition of the signal a pulse is formed, so that there are two pulses for every cycle of signal frequency.

The manner of obtaining and applying the pulses will now be described. The differentiated output from the capacitance resistance combination 48—51 is applied to the cathode 56 of a diode 58. The differentiated output of the capacitance resistance combination 49—52 is applied to the cathode 59 of a diode 63. The plates of the diodes 58 and 63 are connected to one terminal of a resistor 66.

The trigger circuit 54 heretofore referred to is shown, by way of example, as comprising a trigger circuit having a pair of tubes 68 and 69. These tubes are connected in the usual manner to provide a tripped condition of definite time duration. The tube 69 is normally conducting causing a large negative voltage on the grid 71 of the tube 68 keeping it non-conducting. For example, when the trigger circuit is tripped, the tube 68 is rendered conducting with tube 69 non-conducting. The time cycle of the self-restoring trigger circuit is such that the tube 69 again conducts after a definite time period, when tube 68 is rendered non-conductive until tripped by a pulse. The time duration of the tripped condition of the trigger circuit is determined for the most part by a coupling capacitor 72 and a resistor 74. A resistor 76 is connected to ground. A diode 78 is included in the cathode circuit of the tube 68 so that cathode current flows through this diode when the tube 68 conducts.

The diodes 58 and 63 conduct successively when negative pulses are applied to their cathodes, a common conductive path for the diodes being provided by the previously mentioned resistor 66. As either diode conducts a negative pulse is applied to the cathode 79 of the tube 68. After a given time the quiescent condition of the trigger circuit is restored and it is not again tripped until application of the next pulse, which produces a negative pulse at the cathode 79.

Successive pulses are produced upon tripping the trigger circuit 54 the width of which is equal and each pulse is slightly shorter in duration than half the cycle of the input signal when this signal represents substantially the highest deviation frequency. For this condition the pulses follow each other rapidly and their average output.

A demodulator of the character just described is shown and claimed in a copending application of Charles N. Gillespie entitled "Conversion of frequency modulated signals," Serial No. 685,589, filed July 23, 1946.

The operation of the trigger circuit 54 as a demodulator will be reviewed more in detail at this point. Whenever a negative pulse is coupled through the diode 58 to the cathode 79 of the tube 68, this tube starts to conduct through the diode 78 and a negative pulse is coupled from the plate of the tube 68 to the grid 81 of the tube 69 and causes it to become non-conducting. The time constant circuit comprising the resistor 74 and the condenser 72 controls the length of time for which the tube 69 is non-conducting and the tube 68 is conducting. The time may be, for example, about 0.7 times the reciprocal of twice the highest deviation frequency. The result is expressed in seconds as the unit. A resistor 82 is used to return the grid 71 of the tube 68 to a potential slightly more positive than zero when this tube (68) starts to conduct. Each time the tube 68 is shut off, a positive pulse is coupled through a condenser 83 to the grid 84 of a tube 86. Each time the tube 68 conducts, a negative pulse is fed to the tube 86. The time duration of the negative pulses to the tube 86 is substantially constant for all applied deviation frequencies. The number of pulses increases with frequency. Every negative pulse causes the tube 86 to become non-conducting and remain off for a fixed length of time.

A positive signal of fixed duration is thus fed into a filter 88. Filter 88 is a low-pass filter, attenuating all but signal frequencies. At higher frequencies, more of these positive signals are fed into this filter. A demodulated D.-C. output suitable for operating a facsimile recorder of the type operable in response to a demodulated signal is available at the terminal 90.

The output signal from the filter 88 is fed into a voltage divider and bias corrector arrangement comprising a series arrangement of resistors 91 to 96 and a second series arrangement 97 to 103. Contacts 106 are connected between the resistors 91 to 96 and contacts 107 are connected to the resistors 97 to 103. A movable switch bar 109 connects a selected pair of contacts 106 and 107. The output switch 109 may be moved to select certain percentages of the output signal from the filter 88. As the switch selects larger percentages of the filter output voltage, the negative voltage bias is increased. The compensating set of resistors 97 to 103 are switched in so that the bias on the grid 111 of a tube 112 remains constant for the FM carrier frequency (center of the deviation band) no matter which position the switch 109 is in. This switch controls the output AM contrast. Different facsimile recorders (not shown) which may be used and which are to be connected to the system output 156 require different contrasts between black and white to operate properly.

The tube 112 and a tube 114 constitute an AM modulator. The modulating signal is brought in on the grid 111 of the tube 112. The carrier signal is generated by an oscillator comprising tubes 116 and 117. The grid 121 of the tube 117 is connected to the negative terminal 130 of a D.-C. voltage supply source (not shown) and its plate is connected to a tank circuit 122 and 124. The tank circuit is grounded but the reference potential at this point is more positive than the grid 121. The cathodes 126 and 128 of the tubes 117 and 116, respectively, are connected to the terminal 130 through a resistor 131. One stage drives the other through the cathode resistor 131. The plate of the tube 116 is connected to ground through a resistor 134 and its grid is connected to the terminal 130 through two resistors 136 and 134. The output of the tube 117 is coupled back to the input of the tube 116 by way of a condenser 133. An oscillator similar to the one just described appears in "Electronics," for May of 1946. The signal generated by the oscillator is coupled to the grid 141 of the tube 114.

The tubes 112 and 114 are coupled together through a common cathode resistor 143. The amplitude of the carrier signal from the oscillator is sufficiently large to cut off the tube 114.

The modulating signal from the switch 109 causes the current through the resistor 143 and a resistor 144 to vary. This varying current flows in the tube 112 and varies the bias on the tube 114. The amount of current flow through the tube 114 on the positive peaks of the carrier signal varies. An arrangement of this character is disclosed and claimed in a copending application for Letters Patent of the United States, filed July 9, 1947, by E. R. Shenk, entitled "Amplitude modulator," and identified by Serial No. 759,891, now U. S. Patent No. 2,469,747, dated May 10, 1949.

The AM signal from the tube 114 is fed into a band-pass filter 148 which passes only the carrier and its side band. Resistors 151 and 152 serve as terminating resistors for the filter 148 and, also, as a voltage divider. The filtered signal is amplified in a tube 154 which has the primary 155 of a transformer 156 included in its plate circuit. A meter 157 for indicating decibels is connected across the transformer secondary 158 to read the db contrast from black to white. The meter 157 together with the contrast switch 109 enable the AM signal to be adjusted to operate properly with a selected facsimile recorder (not shown). Terminal equipment other than the transformer 156 may be employed, if desired.

Figure 2 of the drawings discloses a frequency meter circuit which may be employed to measure the frequency limits of the signal, which in the illustrative embodiment is obtained from the plate of the tube 21. A terminal 181 is or may be provided for readily obtaining access to the plate connection of this tube. When the apparatus of Figure 1 is to be used with the apparatus of Figure 2, the terminal 181 may be connected to one contact 182 of a switch 184. The remaining contact 186 of the switch is available for other purposes such as the application of a transmitted signal to the frequency meter circuit of Figure 2 as shown in the copending application of the same inventors entitled "Pulse type modulator for facsimile signals," filed November 29, 1947, Serial No. 788,790.

A coupling condenser 188 and a resistor 189 differentiate the square wave input. A differentiated output of this R.-C. circuit is fed as pulses to the cathode 191 of the tube 192. A tube 194 has its plate 196 and cathode 197 connected in series with elements of the tube 192 to ground.

The tube 192 together with the tube 199 and their associated components constitute a trigger circuit with the tube 199 normally conducting and the tube 192 normally non-conducting. The grid 201 of the tube 192 is normally held very negative with respect to its cathode. Bias for this apparatus is supplied from a terminal 203 which is or may be connected to the same point of a suitable voltage supply as the terminal 38 of Figure 1. When a negative pulse is applied to the cathode 191 of the tube 192 it causes this tube to conduct. The tube 194 supplies the electrons through a low impedance path to keep the tube 192 conducting as long as desired.

The grid 206 of a tube 207 is connected to a resistor 208 to the grid 201 of the tube 192. The tube 207 conducts and is non-conducting at the same time as the tube 192. Every time the tube 207 conducts, a fixed amount of current is passed through this tube and through a milliameter 211. As the frequency of the measured signal increases, the number of times current is passed through the milliameter is increased. The current through the milliameter thus increases linearly with frequency.

The plate of the tube 207 is connected to suitable sources of plate voltage (not shown) through a resistor 212 and an adjustable resistor 214. Assuming that a milliameter 211 is used in the cathode circuit of the tube 207 then with a proper value of resistance in the plate circuit of the tube 207 the circuit can be adjusted so that at 2 kilocycles two milliamperes will flow through the meter 211. The meter will then read kilocycles directly as well as milliamperes.

The switch 31, previously mentioned will switch into the receiving circuit a test tone of a predetermined frequency, when the switch is moved from its contact 221 to the contact 223. The tone is used to calibrate the frequency meter. The adjustable resistor 214 is adjusted until the meter reading is the same as the test tone frequency. The switch 31 is mechanically connected to a switch 226 as indicated at 228. The switch 226 shunts a condenser 231 across the condenser 122 and changes the oscillator frequency from the carrier frequency to the test tone frequency. The operation of the apparatus of Figure 1 will, it is believed, be understood from the detailed description of the foregoing. However, the operation will be reviewed briefly at this point. Frequency signals from any type of facsimile scanning system or from receiving terminal equipment are applied to the primary 10 of the transformer 12. This input signal is limited by the tubes 18, 19, 20 and 21. The tube 41 serves as a phase inverter to apply the amplified signals to a demodulator comprising the diodes 58, 63 and 78 and the tubes 68 and 69. This demodulated signal is amplified by a tube 86 and filtered by a filter 88.

The filtered signal is applied to an amplitude modulator comprising tubes 112 and 114 through a contrast control device comprising a switch bar 109. The modulator is provided with a carrier signal from an oscillator comprising the tubes 116 and 117. The amplitude modulated output from this modulator is available for operating facsimile recording devices.

The oscillator also is available for applying a calibrating frequency to the limiter tubes for calibrating the frequency meter shown by Figure 2 of the drawings.

Having now described the invention, what is claimed and desired to be secured by Letters Patent is the following:

1. A facsimile system for converting a frequency modulated signal to a signal suitable for operation of a facsimile recorder, comprising an input filter, a limiter connected to said filter, an FM demodulator connected to said limiter, a filter connected to said demodulator, a contrast control apparatus connected to said filter, a modulator connected to said contrast control apparatus, an oscillator coupled to said modulator, said modulator having a filter in the output circuit thereof, and means for coupling said filter to said circuit, said output circuit including means for observing operation of said contrast control.

2. A facsimile system for converting a frequency modulated signal to a signal suitable for operation of a facsimile recorder, comprising an input filter, a limiter connected to said filter, an FM demodulator connected to said limiter, a filter connected to said demodulator, a contrast control apparatus connected to said filter, a modulator connected to said contrast control apparatus, an oscillator coupled to said modulator, said modulator having a filter in the output circuit thereof, and means for coupling said filter to said circuit, said output circuit including a meter for observing operation of said contrast control.

3. A facsimile system for converting a frequency modulated signal to a signal suitable for operation of a facsimile recorder, comprising an input filter, a D.-C. coupled limiter connected to said filter, an FM demodulator connected to said limiter, a filter connected to said demodulator, a contrast control apparatus connected to said filter, a modulator connected to said contrast control apparatus, an oscillator coupled to said modulator, said modulator having a filter in the output circuit thereof, and means for coupling said filter to said circuit, said output circuit including a meter for observing operation of said contrast control.

4. A facsimile system for converting a frequency modulated signal to a signal suitable for operation of a facsimile recorder, comprising an input filter, a D.-C. coupled cascade limiter connected to said filter, an FM demodulator connected to said limiter, a filter connected to said demodulator, a contrast control apparatus connected to said filter, a modulator connected to said contrast control apparatus, an oscillator coupled to said modulator, said modulator having a filter in the output circuit thereof, and means for coupling said filter to an output circuit, said output circuit including a meter for indicating decibels to provide data directly for operation of said contrast control.

EUGENE R. SHENK.
ANTHONY LIGUORI.

REFERENCES CITED

The following references are of record in the file of this patent:

UNITED STATES PATENTS

| Number | Name | Date |
|---|---|---|
| 1,663,086 | Long | Mar. 20, 1928 |
| 1,711,101 | Shanck | Apr. 30, 1929 |
| 1,901,408 | Peterson | Mar. 14, 1933 |
| 2,243,702 | Hansell | May 27, 1941 |